(12) United States Patent
Romem et al.

(10) Patent No.: US 10,565,054 B2
(45) Date of Patent: Feb. 18, 2020

(54) SYSTEM AND METHOD FOR REDUCING BANDWIDTH CONSUMPTION OF A CLIENT DEVICE ACCESSING A REMOTE STORAGE DEVICE

(71) Applicant: Excelero Storage Ltd., Tel Aviv (IL)

(72) Inventors: Yaniv Romem, Jerusalem (IL); Ofer Oshri, Kfar Saba (IL); Omri Mann, Jerusalem (IL)

(73) Assignee: Excelero Storage Ltd., Tel Aviv (IL)

( * ) Notice: Subject to any disclaimer, the term of this patent is extended or adjusted under 35 U.S.C. 154(b) by 203 days.

(21) Appl. No.: 15/684,439

(22) Filed: Aug. 23, 2017

(65) Prior Publication Data
US 2018/0060172 A1    Mar. 1, 2018

Related U.S. Application Data (60) Provisional application No. 62/381,011, filed on Aug. 29, 2016.

(51) Int. Cl.
*G06F 11/00* (2006.01)
*G06F 11/10* (2006.01)
*G06F 11/20* (2006.01)

(52) U.S. Cl.
CPC ...... *G06F 11/1076* (2013.01); *G06F 11/2025* (2013.01); *G06F 2201/805* (2013.01)

(58) Field of Classification Search
CPC ............... G06F 11/108; G06F 11/1076; G06F 2211/105; G06F 2211/1054; G06F 2211/1057; G06F 2211/1059; G06F 2211/1061; G06F 2211/1064
See application file for complete search history.

(56) References Cited

U.S. PATENT DOCUMENTS

| | | | |
|---|---|---|---|
| 5,309,451 A | 5/1994 | Noya et al. | |
| 5,745,671 A * | 4/1998 | Hodges | G06F 11/1076 711/114 |
| 5,805,788 A | 9/1998 | Johnson | |
| 5,889,934 A * | 3/1999 | Peterson | G06F 11/1076 714/6.12 |
| 6,108,812 A * | 8/2000 | Born | G06F 11/1076 714/807 |

(Continued)

OTHER PUBLICATIONS

Sathiamoorthy, et al., "XORing Elephants: Novel Erasure Codes for Big Data", Proceedings of the VLDB Endowment, vol. 6, No. 5, 2013, pp. 325-336.

*Primary Examiner* — Bryce P Bonzo
*Assistant Examiner* — Jeison C Arcos
(74) *Attorney, Agent, or Firm* — M&B IP Analysts, LLC (57) ABSTRACT

A system and method for reduced bandwidth remote storage between a client device and a storage device storing at least a first data block and a first exclusive or (XOR) product. The method includes: receiving, from the client device, a second exclusive XOR product, wherein the second XOR product is determined based on the first data block and a third data block; reading, from the storage device, the first XOR product, wherein the first XOR product is determined based on the first data block and at least a second data block; determining a third XOR product based on the first XOR product and the second XOR product; and storing, in the storage device, the third XOR product.

19 Claims, 4 Drawing Sheets

(56) References Cited

U.S. PATENT DOCUMENTS

| | | | |
|---|---|---|---|
| 8,307,271 B1* | 11/2012 | Liu | G06F 11/1004 |
| | | | 714/807 |
| 8,910,031 B1* | 12/2014 | Liu | H03M 13/09 |
| | | | 711/111 |
| 9,639,457 B1* | 5/2017 | Piszczek | G06F 13/16 |
| 2006/0059408 A1* | 3/2006 | Chikusa | G06F 11/1076 |
| | | | 714/770 |
| 2008/0109616 A1* | 5/2008 | Taylor | G06F 3/0611 |
| | | | 711/155 |
| 2012/0079143 A1 | 3/2012 | Krishnamurthi et al. | |
| 2015/0089121 A1 | 3/2015 | Coudhury et al. | |
| 2015/0319237 A1 | 11/2015 | Hussain et al. | |
| 2016/0266965 A1* | 9/2016 | B | G06F 11/108 |

* cited by examiner

SYSTEM AND METHOD FOR REDUCING BANDWIDTH CONSUMPTION OF A CLIENT DEVICE ACCESSING A REMOTE STORAGE DEVICE

CROSS-REFERENCE TO RELATED APPLICATIONS

This application claims the benefit of U.S. Provisional Application No. 62/381,011 filed on Aug. 29, 2016, the contents of which are hereby incorporated by reference.

TECHNICAL FIELD

The present disclosure relates generally to remote storage, and more particularly to reducing bandwidth consumption for remote storage.

BACKGROUND

Many standard and non-standard redundant array of independent disks (RAID) levels use a parity scheme such as performing exclusive or (XOR), also known as exclusive disjunction, operations on blocks of data and storing the parity data in a storage device to allow for recovering blocks of data should the storage device fail. Storage of this parity data increases consumption of bandwidth between a client device and a storage server providing remote storage services.

It would therefore be desirous to reduce network bandwidth consumption, thereby overcoming deficiencies of existing solutions.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for reduced bandwidth remote storage between a client device and a storage device storing at least a first data block and a first exclusive or (XOR) product. The method comprises: receiving, from the client device, a second exclusive XOR product, wherein the second XOR product is determined based on the first data block and a third data block, wherein the third data block is a new data block and the first data block is an old data block; reading, from the storage device, the first XOR product, wherein the first XOR product is determined based on the first data block and at least a second data block, wherein the second data block is a recovery data block; determining a third XOR product based on the first XOR product and the second XOR product; and storing, in the storage device, the third XOR product.

Certain embodiments disclosed herein also include a non-transitory computer readable medium having stored thereon instructions for causing a processing circuitry to execute a process for reduced bandwidth remote storage between a client device and a storage device storing at least a first data block and a first exclusive or (XOR) product, the process comprising: receiving, from the client device, a second exclusive XOR product, wherein the second XOR product is determined based on the first data block and a third data block; reading, from the storage device, the first XOR product, wherein the first XOR product is determined based on the first data block and at least a second data block; determining a third XOR product based on the first XOR product and the second XOR product; and storing, in the storage device, the third XOR product.

Certain embodiments disclosed herein also include a system system for providing reduced bandwidth remote storage to a client device, comprising: a storage device, wherein the storage device stores at least a first data block and a first exclusive or (XOR) product: a processing circuitry; and a memory, the memory containing instructions that, when executed by the processing circuitry, configure the system to: receive, from the client device, a second exclusive XOR product, wherein the second XOR product is determined based on the first data block and a third data block; read, from the storage device, the first XOR product, wherein the first XOR product is determined based on the first data block and at least a second data block; determine a third XOR product based on the first XOR product and the second XOR product; and store, in the storage device, the third XOR product.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system reduced bandwidth remote storage between a client device and a remote storage server including a storage device. A data block including a product of a first exclusive or (XOR) function between a first old block of data and a third new block of data is received. The old block of data is previously stored in the storage device, and the new block of data is to be written to the storage device. A data block including a product of a second XOR function between the old block of data and a second recovery block of data is read from the storage device. The recovery block of data may be utilized to recover data stored in the storage device in the event of failure. A third XOR function is performed between the first XOR product and the second XOR product. The product of the third XOR function is stored in the storage device. It should be noted that a XOR product may be also a result of any exclusive disjunction operation.

Receiving (and, consequently, sending) a single block of data including an XOR product instead of two individual blocks of data as described herein allows for conserving computing resources. Specifically, network bandwidth utilized to transmit the data blocks is reduced. Further, due to the properties of the XOR function, the resulting third XOR product is equivalent to the XOR product that would be obtained using the separate data blocks.

Figure 1:
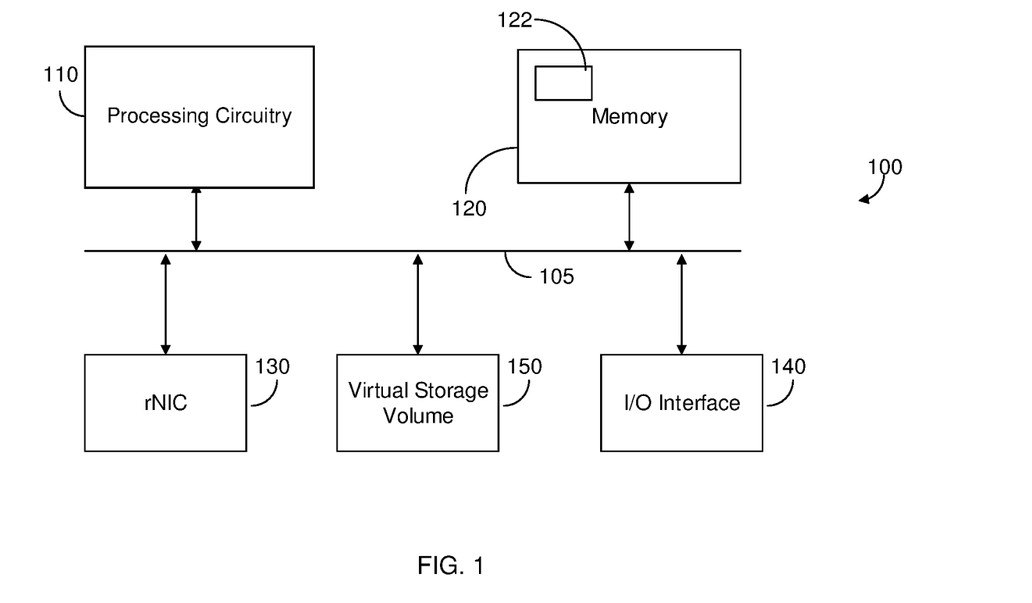
FIG. 1 is a schematic diagram of a client device configured for remote storage access to a server.

FIG. 1 is an example schematic diagram of a client device 100 configured for access to a remote storage server according to an embodiment. The client device 100 includes a processing circuitry 110 coupled to a memory 120, a remote network interface card (rNIC) 130, an input/output (I/O) Interface 140, and a virtual storage volume 150. The components of the client device 100 may be communicatively connected via a bus 105. In an embodiment, the client device 100 is configured for remote direct memory access (RDMA) to the storage server 200, FIG. 2.

In an embodiment, the processing circuitry 110 is configured to perform RDMA to the remote storage server. To this end, the rNIC 130 is configured to provide network access, thereby allowing for sending and receiving of data over a network (not shown). The rNIC 130 may include multiple communication ports for communicating with storage devices (not shown). The I/O interface 140 may allow for receiving inputs via an input device such as, but not limited to, a mouse, a keyboard, a touchscreen, and the like; and for sending outputs via an output device such as, but not limited to, a display, a printer, and the like.

The virtual storage volume 150 includes virtual address blocks, where each virtual address block corresponds to a physical address block. The corresponding physical address blocks may be included in one or more storage devices (not shown) accessed using the rNIC 130. Each storage device may be included in or otherwise connected to a different storage server. In some implementations, the virtual storage volume 150 may correspond to a single physical remote storage device.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. The memory 120 may include a memory portion 122 configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 110 to generate and send XOR products to be utilized for reduced bandwidth remote storage as described herein. The memory 120 may also be used as a working scratch pad for the processing circuitry 110, a temporary storage, and the like.

Figure 2:
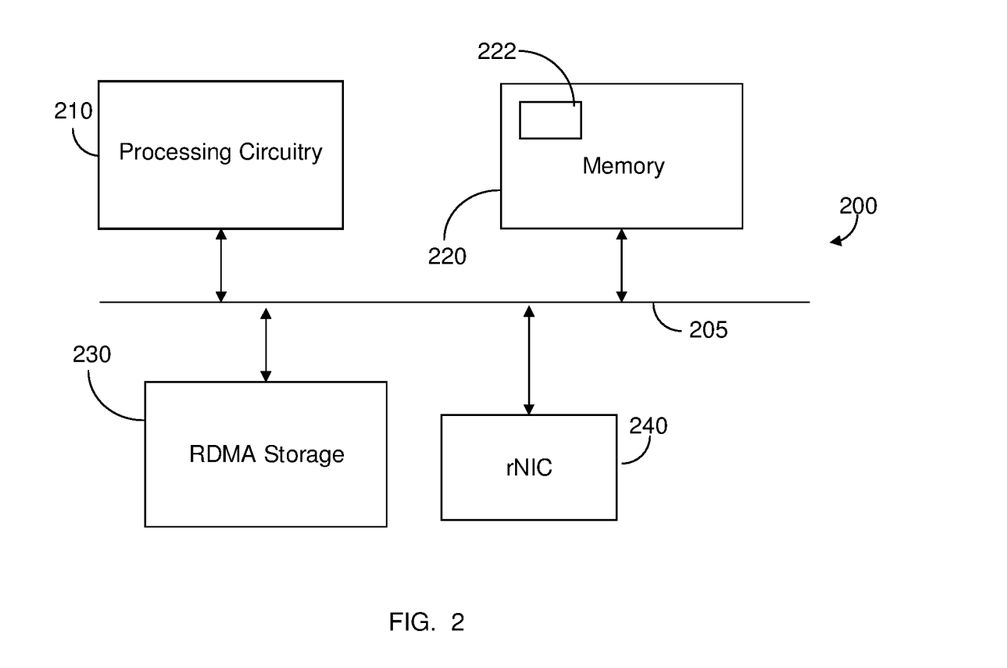
FIG. 2 is a schematic diagram of a storage server for providing reduced bandwidth remote storage according to an embodiment.

FIG. 2 is an example schematic diagram of a storage server 200 for providing reduced bandwidth remote storage according to an embodiment. The storage server 200 includes a processing circuitry 210 coupled to a memory 220, a remote direct memory access (RDMA) storage 230, and a remote network interface card (rNIC) 240. The components of the storage server 200 may be communicatively connected via a bus 205.

In an embodiment, the processing circuitry 210 is configured to provide reduced bandwidth remote storage in accordance with the disclosed embodiments. The remote storage may include storing data in the RDMA storage 230. To this end, the rNIC 240 is configured to provide network access, thereby allowing for sending and receiving of data over a network (not shown). The rNIC 240 may be an RDMA-enabled NIC.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. The memory 220 may include a memory portion 222 configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to provide reduced bandwidth remote storage, as discussed herein. The memory 220 may also be used as a working scratch pad for the processing circuitry 210, a temporary storage, and the like.

Figure 3:
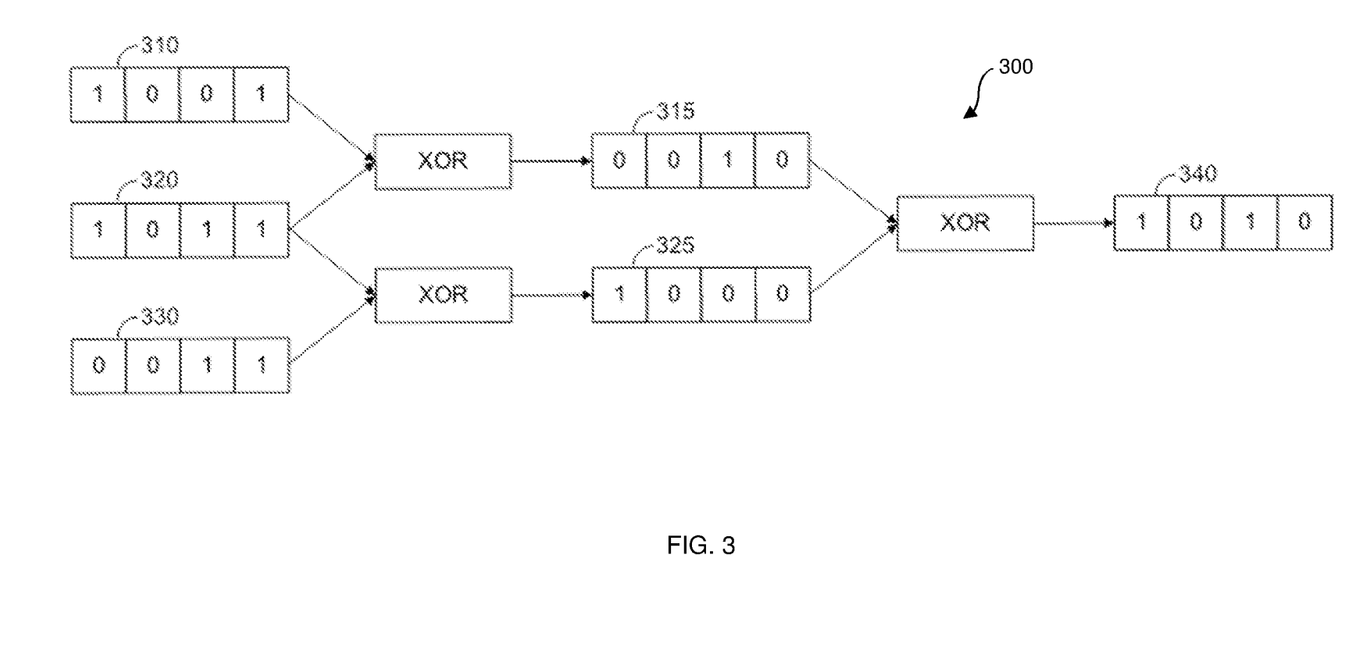
FIG. 3 is a schematic illustration of a scheme for reducing remote storage access network bandwidth consumption according to an embodiment.

FIG. 3 is an example schematic illustration 300 of a scheme for reducing remote storage access network bandwidth consumption according to an embodiment. In the example schematic illustration 300, data blocks of 4 bits are utilized. It should be noted that larger, smaller, or different data blocks may be equally utilized without departing from the scope of the disclosed embodiments.

A first old data block 320 and a second recovery data block 330 are input to an XOR engine, which creates a first XOR product 325. A storage server (e.g., the storage server 200) may store the first XOR product 325 and the old data block 320 or the recovery data block 330. Storing the XOR product 325 along with one of the data blocks 320 or 330 used to create the XOR product 325 in the storage server allows for recovering the data block that was not stored in the storage server in the event of failure of a storage device storing that data block. This can be performed by performing an XOR function between the XOR product 325 and the data block 320 or 330. As a non-limiting example, a storage server may store the XOR product 325 and the recovery data block 330, thereby allowing for recovery of the old data block 320 by performing an XOR function between the XOR product 325 and the recovery data block 330.

A user device (for example, the user device 100) may send a write command to replace data stored by the storage server. In an example implementation, the write command is to replace the old data block 320 with a third new data block 310. The client device generates a second XOR product 315 between the old data block 320 and the new data block 310.

The second XOR product 315 is sent to the storage server storing the recovery data block 330 and the first XOR product 325. The storage server creates a third XOR product 340 based on the first XOR product 325 and the second XOR product 315, and replaces the first XOR product 325 with the third XOR product 340 in storage.

If a second storage server stores the old data block 320, the client device may further send the new data block 310 to replace the old data block 320 in a storage device of the second storage server.

Figure 4:
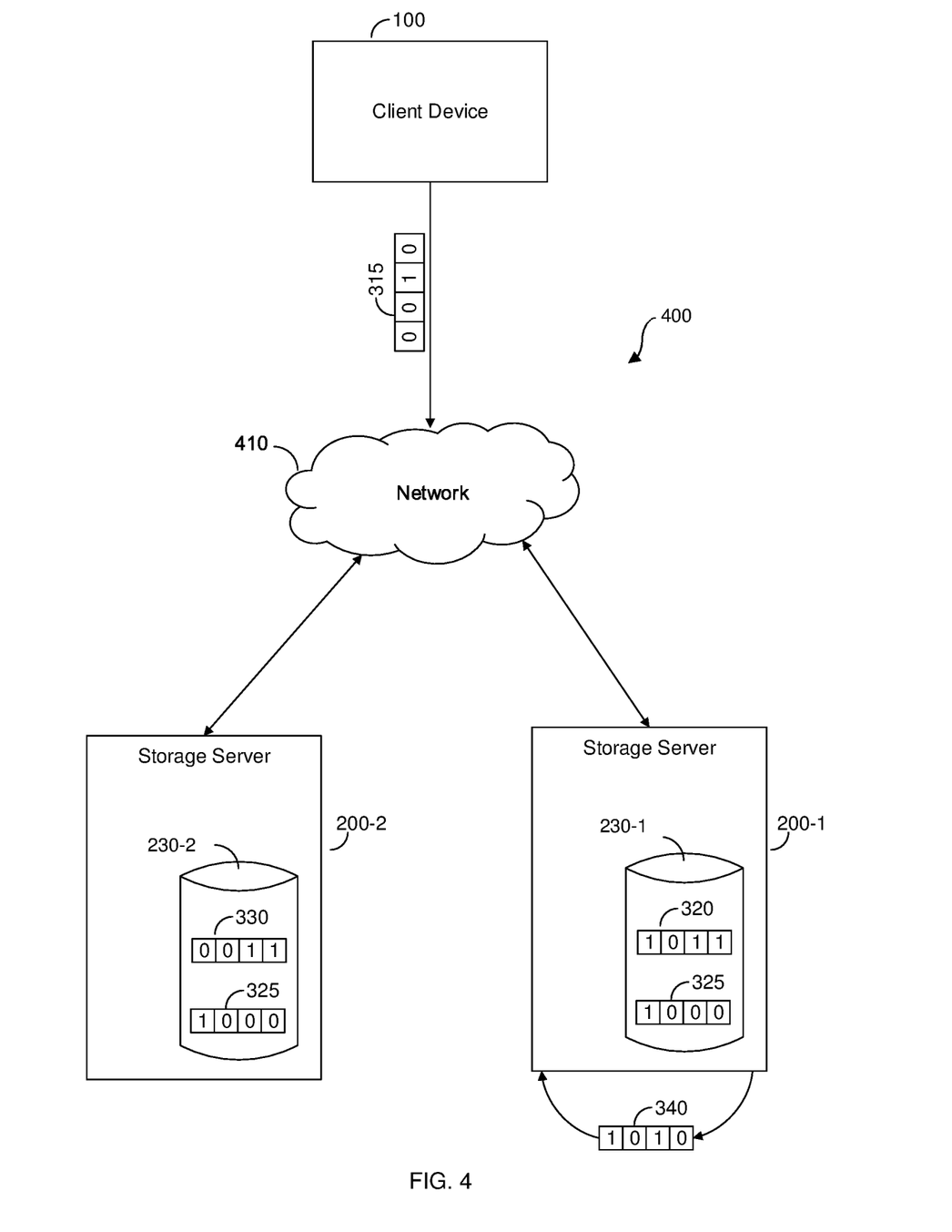
FIG. 4 is a network diagram illustrating a client device remotely accessing storage servers using a reduced network bandwidth scheme.

FIG. 4 is an example network diagram 400 illustrating a client device remotely accessing storage servers using a reduced network bandwidth scheme. The example network diagram 400 includes the client device 100 communicatively connected to a first storage server 200-1 and a second storage server 200-2 via a network 410. The network 410 may be, but is not limited to, a wireless, cellular or wired network, a local area network (LAN), a wide area network (WAN), a metro area network (MAN), the Internet, the worldwide web (WWW), similar networks, and any combination thereof.

In the example network diagram 400, the first storage server 200-1 includes a storage device 230-1 storing the first old data block 320 and the first XOR product 325. As noted above, the first XOR product 325 is created based on the old data block 320 and the second recovery data block 330. The second storage server 200-2 includes a storage device 230-2 storing the recovery data block 330 and the first XOR product 325.

In an example implementation (not shown), the client device 100 is configured to send, via the network 410, the second XOR product 315 to the second storage server 200-2. The second XOR product 315 is created by the client device 100 based on the old data block 320 and the third new data block 310 included in a write request from the client device 100. The second storage server 200-2 reads the first XOR product 325 from the storage device 230-2 and generates the third XOR product 340 based on the first XOR product 325 and the second XOR product 315. The resulting third XOR product 340 is stored in the storage device 230-2 and the first XOR product 325 may be erased, thereby replacing the first XOR product 325.

In another example implementation (as shown), the client device 100 is configured to send the first storage server 200-1 the second XOR product 315 and the new data block 310. The first storage server 200-1 reads the first XOR product 325 from the storage device 230-1 and performs an XOR function between the first XOR product 325 and the second XOR product 315. The resulting third XOR product 340 is stored in the storage device 230-1, thereby replacing the first XOR product 325. Further, the new data block 310 is stored in the storage device 230-1 and the old data block 320 may be erased, thereby replacing the old data block 320.

In yet another example implementation (not shown), the client device 100 is configured to send the second XOR product 315 to the first storage server 200-1. The first storage server 200-1 reads the first XOR product 325 from the storage device 230-1 and performs an XOR function between the first XOR product 325 and the second XOR product 315. The resulting third XOR product 340 is stored in the storage device 230-1. The first storage server 200-1 reads the old data block 320 from the storage device 230-1 and performs an XOR function between the old data block 320, the third XOR product 340, and the first XOR product 325. The result is the new data block 310, which may be stored in the storage device 230-1. When the new data block 310 is stored in the storage device 230-1, the old data block 320 and the first XOR product 325 may be erased.

It should be noted that FIG. 4 is depicted with respect to two storage servers merely for simplicity and without limitation on the disclosed embodiments. The disclosed embodiments may be equally applicable to other numbers of storage servers.

Figure 5:
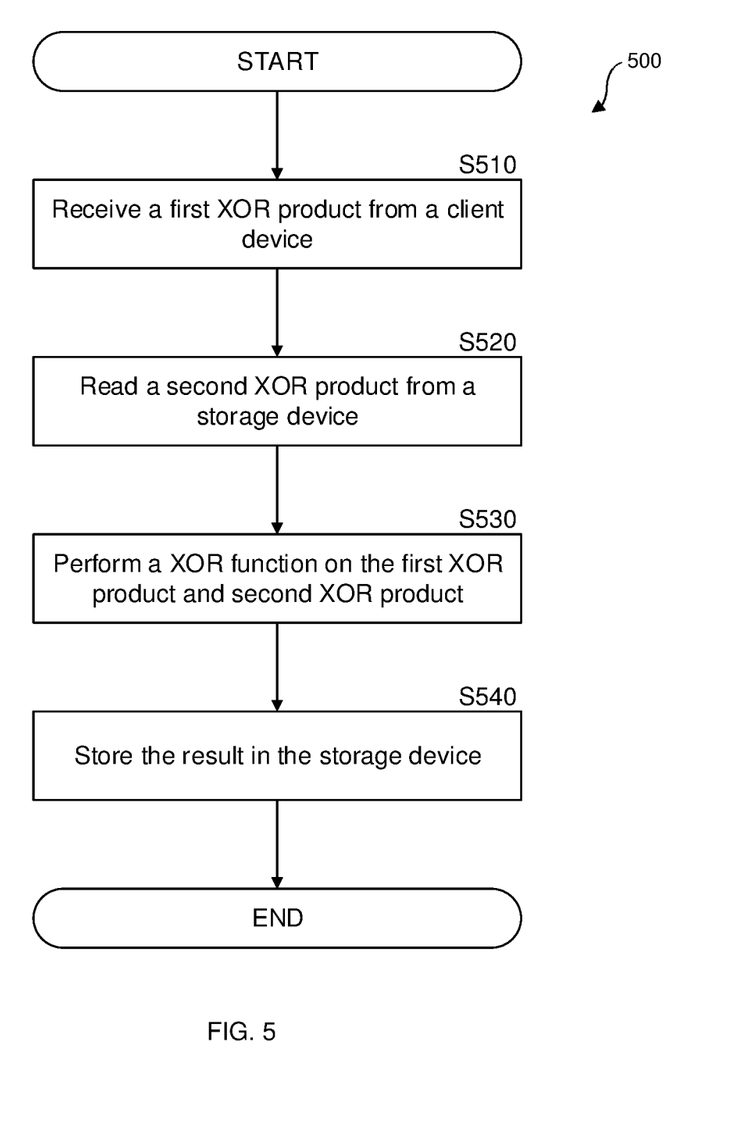
FIG. 5 is a flowchart illustrating a method for reduced bandwidth remote storage between a client device and a remote storage device according to an embodiment.

FIG. 5 is an example flowchart 500 illustrating a method for reduced bandwidth remote storage between a client device and a remote storage according to an embodiment.

In an embodiment, the method is performed with respect to a first old data block, a second recovery data block, and a third new data block. The old data block and a first XOR product are stored on a first storage device. The recovery data block may be stored in a second storage device or in the first storage device. The first XOR product is determined based on the old data block and the recovery data block. The new data block may be indicated in a write request directed to the first storage device received from the client device.

In an embodiment, the remote storage is a storage server including a third storage device. In a further embodiment, the method is performed by the remote storage.

At S510, a data block including a second XOR product is received from the client device. The received second XOR product is created based on the old data block and the new data block. In an example implementation, the second XOR product is generated by the client device.

At S520, a data block including the first XOR product is read from a storage device. The first XOR product is generated based on the old data block and the recovery data block, and may be generated by an XOR engine of the remote storage.

At S530, a third XOR product is determined based on the first XOR product and the second XOR product. In an embodiment, S530 includes performing an XOR function between the first XOR product and the second XOR product. Due to properties of the XOR function, the resulting third XOR product is identical to an XOR product that would be generated based on the recovery data block and the new data block. Thus, by transmitting only a single data block including the second XOR product rather than transmitting two data blocks (the old and new data blocks), network bandwidth is conserved while allowing for creation of a new XOR product to be used in case of failure of the first storage device.

At S540, the third XOR product is stored in the storage device. In an embodiment, the first XOR product may be replaced with the third XOR product in the storage device. In another embodiment, the first XOR product may remain stored for a predetermined period of time, a dynamically determined period of time, or a combination thereof (e.g., a sum of a predetermined period of time and a dynamically determined period of time. Keeping the first XOR product stored at least temporarily allows for recovering data which has been rewritten in the event of failure of the remote storage.

As a non-limiting example, a first storage device stores a data block "A," a second storage device stores a data block "B," and a third storage device stores the first XOR product A⊕B. This scheme allows for restoring the value of data block "A" if the first storage device fails by generating an XOR product from the XOR product A⊕B stored in the third storage and the value B stored in the second storage, in other words, (A⊕B)⊕B=A.

A client device attempts to replace the data block "A" in the first storage device with a new data block "C." The client device generates a second XOR product A⊕C and sends it to a remote storage including the third storage device. The remote storage reads the first XOR product A⊕B from the third storage device and performs an XOR function between the first XOR product A⊕B and the second XOR product A⊕C, thereby resulting in a third XOR product A⊕B⊕A⊕C, which is equal to B⊕C. By sending, from the client device, a single data block including the second XOR product A⊕C instead of two separate data blocks "A" and "C," network bandwidth is conserved.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for reduced bandwidth remote storage between a client device and a storage device storing at least a first data block and a first exclusive or (XOR) product, comprising:
   receiving, from the client device, a second XOR product, wherein the second XOR product is determined based on the first data block and a third data block, wherein the third data block is a new data block and the first data block is an old data block;
   reading, from the storage device, the first XOR product, wherein the first XOR product is determined based on the first data block and at least a second data block, wherein the second data block is a recovery data block;
   determining a third XOR product based on the first XOR product and the second XOR product; and
   storing, in the storage device, the third XOR product.

2. The method of claim 1, wherein the second XOR product is received by each of a plurality of storage servers.

3. The method of claim 1, wherein the storage device is included in a storage server, wherein communications between the storage server and the client device include using a remote direct memory access protocol.

4. The method of claim 1, further comprising:
   receiving, from the client device, the third data block; and
   storing, in the storage device, the third data block.

5. The method of claim 4, further comprising:
   erasing the first data block from the storage device when the third XOR product and the third data block are stored in the storage device.

6. The method of claim 1, further comprising:
   reading the first data block from the storage device;
   determining a fourth XOR product based on the first data block, the third XOR product, and the first XOR product, wherein the fourth XOR product is equal to a value of the third data block; and
   storing the fourth XOR product in the storage device.

7. The method of claim 6, further comprising:
   erasing the first data block and the first XOR product from the storage device when the fourth XOR product is stored in the storage device.

8. The method of claim 1, further comprising:
   erasing the first XOR product when the third XOR product is stored in the storage device.

9. The method of claim 1, further comprising:
   recovering the second data block using the third data block and the third XOR product.

10. A non-transitory computer readable medium having stored thereon instructions for causing a processing circuitry to execute a process for reduced bandwidth remote storage between a client device and a storage device storing at least a first data block and a first exclusive or (XOR) product, the process comprising:

receiving, from the client device, a second XOR product, wherein the second XOR product is determined based on the first data block and a third data block;

reading, from the storage device, the first XOR product, wherein the first XOR product is determined based on the first data block and at least a second data block;

determining a third XOR product based on the first XOR product and the second XOR product; and storing, in the storage device, the third XOR product.

11. A system for providing reduced bandwidth remote storage to a client device, comprising:

a storage device, wherein the storage device stores at least a first data block and a first exclusive or (XOR) product;

a processing circuitry; and a memory, the memory containing instructions that, when executed by the processing circuitry, configure the system to:

receive, from the client device, a second XOR product, wherein the second XOR product is determined based on the first data block and a third data block;

read, from the storage device, the first XOR product, wherein the first XOR product is determined based on the first data block and at least a second data block;

determine a third XOR product based on the first XOR product and the second XOR product; and store, in the storage device, the third XOR product.

12. The system of claim 11, wherein the second XOR product is received by each of a plurality of storage servers.

13. The system of claim 11, wherein communications between the system and the client device include using a remote direct memory access protocol.

14. The system of claim 11, wherein the system is further configured to:

receive, from the client device, the third data block; and store, in the storage device, the third data block.

15. The system of claim 14, wherein the system is further configured to:

erase the first data block from the storage device when the third XOR product and the third data block are stored in the storage device.

16. The system of claim 11, wherein the system is further configured to:

read the first data block from the storage device;

determine a fourth XOR product based on the first data block, the third XOR product, and the first XOR product, wherein the fourth XOR product is equal to a value of the third data block; and store the fourth XOR product in the storage device.

17. The system of claim 16, wherein the system is further configured to:

erase the first data block and the first XOR product from the storage device when the fourth XOR product is stored in the storage device.

18. The system of claim 11, wherein the system is further configured to:

erase the first XOR product when the third XOR product is stored in the storage device.

19. The system of claim 11, wherein the system is further configured to:

recover the second data block using the third data block and the third XOR product.

* * * * *